United States Patent
Wallis

[19]

[11] Patent Number: 6,161,683
[45] Date of Patent: Dec. 19, 2000

[54] CONVEYOR QUICK RELEASE IDLER ASSEMBLY

[75] Inventor: Andy B. Wallis, Kalamazoo, Mich.

[73] Assignee: Borroughs Corporation, Kalamazoo, Mich.

[21] Appl. No.: 09/208,670

[22] Filed: Dec. 10, 1998

[51] Int. Cl.[7] .................................................. B65G 23/44
[52] U.S. Cl. ............................................ 198/816; 198/813
[58] Field of Search ..................................... 198/816, 813

[56] References Cited

U.S. PATENT DOCUMENTS

| | | | |
|---|---|---|---|
| 3,694,068 | 9/1972 | Jordan ..................................... | 198/813 |
| 3,752,298 | 8/1973 | Wenger ................................... | 198/816 |
| 3,921,793 | 11/1975 | Hutchinson et al. ................... | 198/816 |
| 3,944,054 | 3/1976 | Ensinger . | |
| 3,993,185 | 11/1976 | Fleckenstein et al. ................ | 198/813 |
| 4,007,827 | 2/1977 | Mattos ................................... | 198/813 |
| 4,803,804 | 2/1989 | Bryant ................................... | 198/813 |

FOREIGN PATENT DOCUMENTS

| | | | |
|---|---|---|---|
| 406183534 | 7/1994 | Japan ..................................... | 198/816 |
| 2041315 | 9/1980 | United Kingdom ................... | 198/816 |

*Primary Examiner*—Robert P. Olszewski
*Assistant Examiner*—Steven B. McAllister
*Attorney, Agent, or Firm*—Howard & Howard

[57] ABSTRACT

A quick release assembly for a check-out conveyor assembly is disclosed. The check-out conveyor assembly includes a frame member having a pair of opposed side rails that receive a series of guides including an idler guide and a drive guide. A conveyor belt encircles the series of guides and is rotatable within the side rails. A quick release assembly is mounted on each of the side rails and is moveable between a locked position and an unlocked position. When the quick release assembly is moved to the locked position the idler guide is moved from a disengaged position to an engaged position. When the idler guide is at the engaged position the drive guide is able to rotate the conveyor belt. The quick release assembly comprises a take-up arm rotatably secured to a first end of a push bar and a release handle rotatably secured to a second end of the push bar. The release handle is pivotally fixed to the side rail. Rotation of the release handle about a pivot point moves the quick release assembly between the locked position and the unlocked position. The quick release assembly allows for rapid disengagement of the idler guide to permit repair or maintenance of the check-out conveyor assembly. In addition, the quick release assembly ensures that the conveyor belt is easily aligned and centered in the check-out conveyor assembly.

18 Claims, 3 Drawing Sheets

CONVEYOR QUICK RELEASE IDLER ASSEMBLY

FIELD OF THE INVENTION

The present invention relates generally to a check-out conveyor assembly and, more particularly, to a check-out conveyor assembly having a quick release assembly.

BACKGROUND OF THE INVENTION

The present invention relates to a quick release assembly for a check-out conveyor assembly. A conventional check-out conveyor assembly comprises a conveyor belt that rotates around a series of guides supported within a pair of side rails. Typically, the series of guides includes at least an idler guide and a drive guide, which has a drive motor. To enable the conveyor belt to move merchandise from one end of the check-out conveyor assembly to another end of the assembly it is necessary that the conveyor belt be under a certain amount of tension. Often this tension is achieved by adjusting the position of the idler guide relative to the other guides of the check-out conveyor assembly.

Occasionally it is necessary to at least partially disassemble a check-out conveyor assembly to perform repair and maintenance operations on the assembly. Typically, the disassembly involves removing at least one of the guides, usually the idler guide, to relieve the tension on the conveyor belt and permit access to the parts of the check-out conveyor assembly. One difficulty in the repair and maintenance of conventional check-out conveyor assemblies arises from the long time required for disassembly and reassembly of the check-out conveyor assembly. In addition, a large portion of the repair time is spent in obtaining proper tension on the conveyor belt and in the centering and aligning of the, conveyor belt relative to the guides of the check-out conveyor assembly when repairs are completed. Thus, it is desirable to provide a quick release assembly that will permit for rapid removal and installation of a conveyor belt to a check-out conveyor assembly. In addition, it is furthermore desirable that the quick release assembly have a rapid and reliable means for centering and aligning the conveyor belt relative to the other guides of the check-out conveyor assembly.

SUMMARY OF THE INVENTION

In general terms, this invention provides a check-out conveyor assembly having a quick release assembly that speeds repair and maintenance of the check-out conveyor assembly.

In a preferred embodiment a check-out conveyor assembly for transporting merchandise comprises a frame member having a pair of opposing side rails each including a quick release assembly. Each of the quick release assemblies is moveable between a locked position and an unlocked position. An idler guide is rotatably received in each of the opposing side rails and is moveable between an engaged position and a disengaged position. Each of the quick release assemblies includes a take-up arm that is rotatably secured to a first end of a push bar and a release handle that is rotatably secured to a second end of the push bar. The release handle is further pivotally secured to the side rail. The quick release assemblies maintain the idler guide at the engaged position when the quick release assemblies are at the locked position. The quick release assemblies permit the idler guide to move to the disengaged position when they are at the unlocked position.

Thus, a quick release assembly is provided that enables a user to rapidly disassemble a check-out conveyor assembly for repair or maintenance. In addition, the location and functioning of the quick release assembly assures that a conveyor belt of the check-out conveyor assembly can be rapidly and reliably aligned and centered on the idler guide of the check-out conveyor assembly during reassembly.

These and other features and advantages of this invention will become more apparent to those skilled in the art from the following detailed description of the presently preferred embodiment. The drawings that accompany the detailed description can be described as follows.

DETAILED DESCRIPTION OF THE PREFERRED EMBODIMENT

Figure 1:
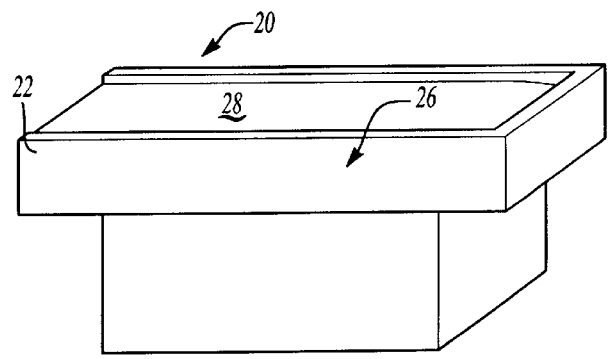
FIG. 1 is a side perspective view of a check-out counter.

A side perspective view of a check-out counter is generally indicated at 20 in FIG. 1. Check-out counter 20 includes a counter 22 mounted on a base 24. A check-out conveyor assembly 26 is mounted within check-out counter 20 and includes a conveyor belt 28.

Figure 2:
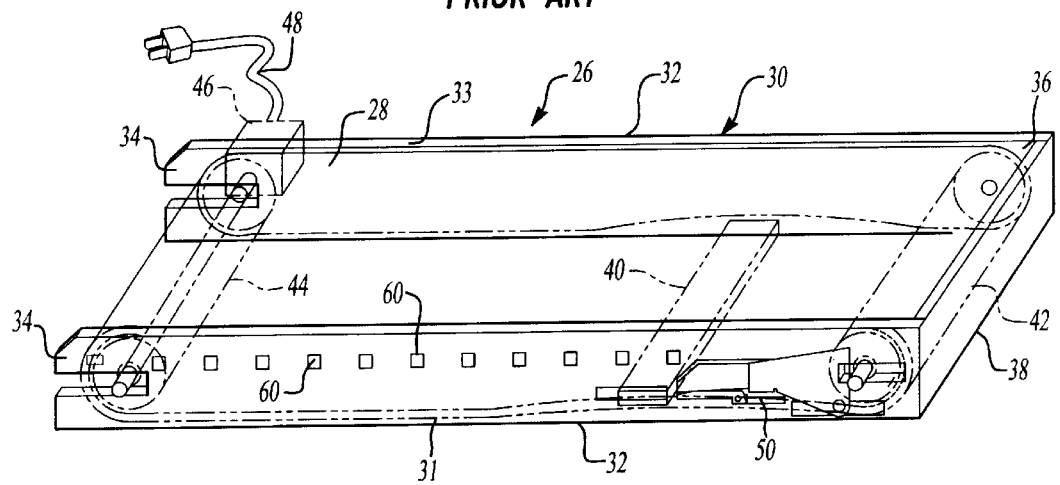
FIG. 2 is a side perspective view of a check-out conveyor assembly designed in accordance with the present invention

FIG. 2 is a side perspective view of check-out conveyor assembly 26. Check-out conveyor assembly 26 includes a frame member 30. Frame member 30 includes a pair of opposed side rails 32. Side rails 32 are mirror images of each other. Each of side rails 32 include an outer face 31, an inner face 33, a first end 34, and a second end 36. A cross-member 38 is located adjacent second end 36 of each of side rails 32 and secures side rails 32 to each other a fixed distance apart. A support member 40 (shown in phantom) extends between side rails 32 and also secures side rails 32 to each other.

An idler guide 42 (shown in phantom) is located adjacent second end 36 of each of side rails 32. A drive guide 44 (shown in phantom) is positioned adjacent first end 34 of each of side rails 32. Drive guide 44 includes a motor 46 (shown in phantom). Motor 46 includes a power cord 48 for providing power to motor 46. As would be understood by one of ordinary skill in the art, check-out conveyor assembly 26 may include other guides, which are not shown for simplicity.

Conveyor belt 28 encircles idler guide 42 and drive guide 44. As shown, conveyor belt 28 travels above support member 40. When idler guide 42 is spaced an appropriate distance from drive guide 44, when at an engaged position as described below, motor 46 is able to rotate conveyor belt 28 around drive guide 44 and idler guide 42 to transport merchandise from one end of check-out conveyor assembly 26 to the other end of check-out conveyor assembly 26. Check-out conveyor assembly 26 further includes a pair of quick release assemblies 50. One quick release assembly 50 is located adjacent each second end 36 of each of side rails 32.

Figure 3:
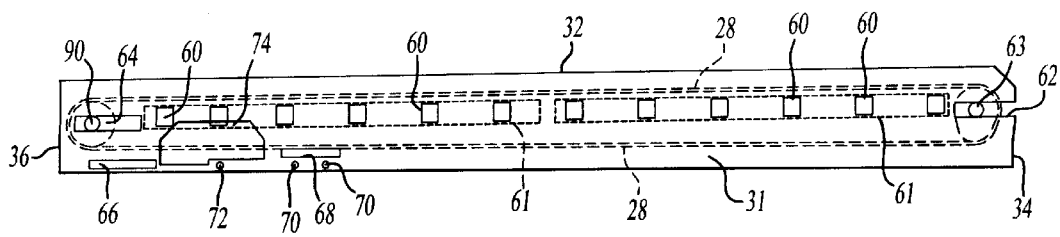
FIG. 3 is a side elevation view of a check-out conveyor assembly side rail designed in accordance with the present invention.

FIG. 3 is a side elevation view of side rail 32. As explained above, each side rail 32 is a mirror image of the other side rail 32, therefore only one side rail 32 will be described. The side rail 32 depicted in FIG. 3 is the back side rail 32 turned 180°.

Side rail 32 includes a plurality of support tabs 60 arranged between first end 34 and second end 36. Support tabs 60 function to engage and support a plurality of conveyor belt pans 61 (shown in phantom). Each conveyor belt pan 61 extends between side rails 32. Conveyor belt pan 61 provides support to conveyor belt 28 as conveyor belt 28 rotates about drive guide 44 and idler guide 42. Conveyor belt pan 61 is removable from support tabs 60 as is known in the art.

Side rail 32 further includes a drive guide slot 62 located adjacent first end 34. Drive guide slot 62 receives a portion of a drive guide axle 63 that extends from each end of drive guide 44. Adjacent second end 36 of side rail 32 is an idler guide slot 64. Idler guide slot 64 receives a portion of an idler guide axle 90 that extends from each end of idler guide 42. Idler guide 42 is slidable within idler guide slot 64.

A take-up arm slot 66 is located adjacent second end 36 of side rail 32. Take-up arm slot 66 is positioned below idler guide slot 64. A tension cutout 74 is located adjacent take-up arm slot 66 to provide access to a threaded tension adjustment screw 110, described below. A release handle pivot hole 72 is located below tension cutout 74.

A support member slot 68 is located adjacent tension cutout 74. Support member slot 68 receives a portion of support member 40 which is secured to side rail 32 by fasteners (not shown) that engage a plurality of apertures 70 located adjacent support member slot 68.

As can be seen in FIG. 3, once drive guide 44 is received in drive guide slot 62 tension can be applied to conveyor belt 28 by sliding idler guide 42 toward second end 36 of side rail 32 into the engaged position.

Figure 4:
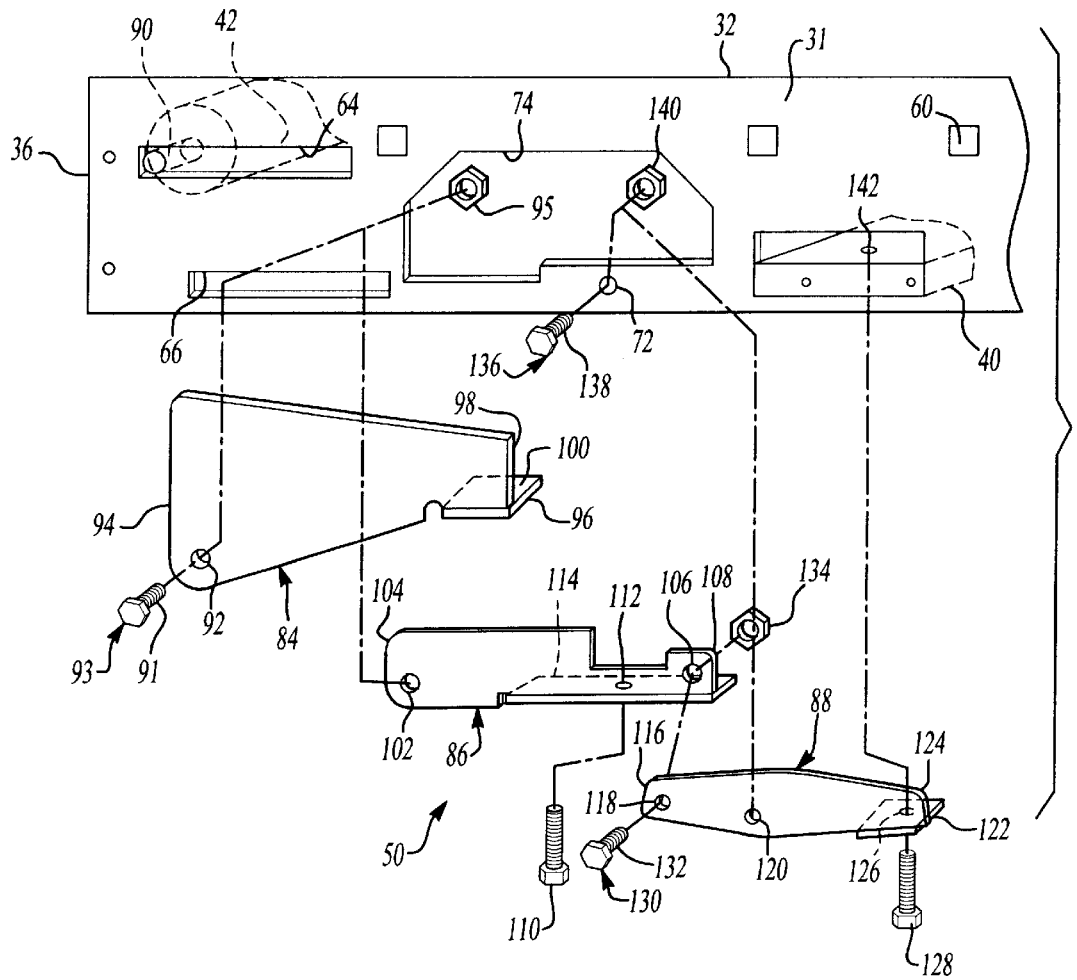
FIG. 4 is an exploded view of a quick release assembly designed in accordance with the present invention.

FIG. 4 is an exploded view of quick release assembly 50 and a portion of side rail 32. Because each quick release assembly 50 is a mirror image of the other and each side rail 32 is a mirror image of the other, only one quick release assembly 50 will be described. Quick release assembly 50 comprises a take-up arm 84, a push bar 86, and a release handle 88. Take-up arm 84 has a first end 94 and a second end 98. An aperture 92 is located adjacent first end 94. A tension pad 96 having an upper surface 100 is located adjacent second end 94. Tension pad 96 is preferably oriented perpendicular to second end 98. A fastener 93 is received in aperture 92 and extends through take-up arm slot 66 to rotatably mount take-up arm 84 to side rail 32. Preferably, fastener 93 comprises a bolt 91 and a nut 95, as shown.

Push bar 86 has a first end 104 and a second end 108. An aperture 102 is located adjacent first end 104. An aperture 106 is located adjacent second end 108. A tension support 114 extends from push bar 86 and includes a threaded aperture 112. Preferably, tension support 114 is oriented perpendicular to second end 108. A threaded tension adjustment screw 110 is received in threaded aperture 112. Fastener 93 extends from aperture 92 of take-up arm 84 through take-up arm slot 66 and aperture 102 of push bar 86. Nut 95 is received on fastener 93 to rotatably secure take-up arm 84 to first end 104 of push bar 86. Fastener 93, take-up arm 84, and push bar 86 are freely slidably within take-up arm slot 66.

Release handle 88 has a first end 116 and a second end 124. An aperture 118 is located adjacent first end 116. A tab 122 extends from second end 124 of release handle 88. Preferably, tab 122 is oriented perpendicular to second end 124. Tab 122 includes an aperture 126. A fastener 130 is received in. aperture 118 and extends through aperture 106 of push bar 86 to rotatably secure release handle 88 to second end 108 of push bar 86. A locking bolt 128 is received in aperture 126 and threads into an aperture 142 in support member 40. Apertures 126 and 142 are aligned when quick release assembly 50 is at a locked position. Locking bolt 128 releasably secures quick release assembly 50 in a locked position as described more fully below. Release handle 88 includes a pivot aperture 120. Pivot aperture 120 and release handle pivot hole 72 receive a pivot fastener 136 which pivotally fixes release handle 88 to side rail 32. Preferably, pivot fastener 136 comprises a bolt 138 and a nut 140.

When check-out conveyor assembly 26 is assembled, conveyor belt 28 wraps around idler guide 42 as described above. Rotation of threaded tension adjustment screw 110 moves tension pad 96 and rotates take-up arm 84 about fastener 93. Rotation of take-up arm 84 about fastener 93 changes the engagement of first end 94 with idler guide axle 90. Thus, adjustment of threaded tension adjustment screw 110 to rotate first end 94 toward second end 36 of side rail 32 increases the tension on conveyor belt 28 by shifting idler guide 42 toward second end 36. Adjustment of threaded tension adjustment screw 110 to rotate first end 94 away from second end 36 of side rail 32 decreases the tension on conveyor belt 28 by permitting idler guide to move away from second end 36. Thus, tension pad 96 and threaded tension adjustment screw 110 provide a means to adjust the tension on conveyor belt 28 after idler guide 42 is moved to the engaged position, described more fully below.

Figure 5:
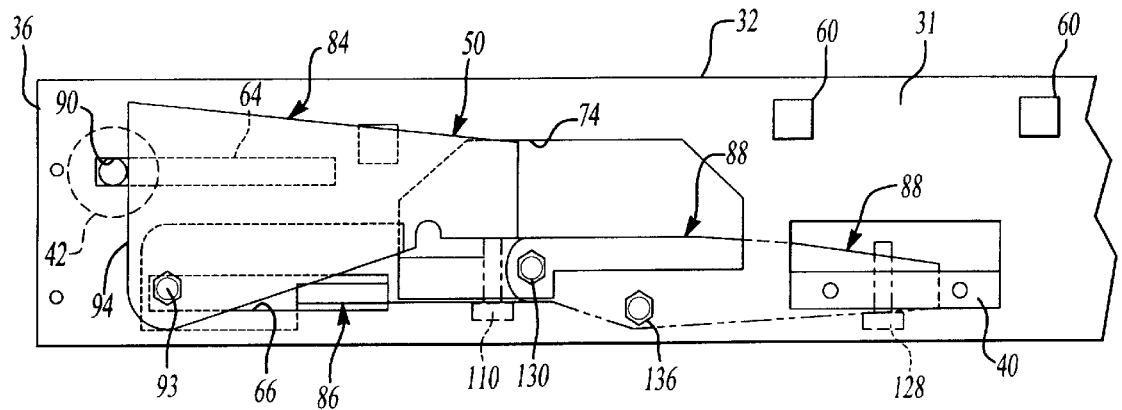
FIG. 5 is a side view of the quick release assembly at a locked position.

FIG. 5 is a side view of quick release assembly 50 shown at a locked position. In FIG. 5 idler guide 42 is shown at the engaged position. For simplicity, conveyor belt pan 61 and conveyor belt 28 are not shown. Release handle 88 is freely rotatable about pivot fastener 136. Rotation of release handle 88 away from second end 36 of side rail 32 moves quick release assembly 50 into the locked position. As release handle 88 is rotated away from second end 36 push bar 86 and take-up arm 84 are slid within take-up arm slot 66 toward second end 36. First end 94 of take-up arm 84 moves idler guide axle 90 toward second end 36. When idler guide 42 is engaged as shown in FIG. 5, conveyor belt 28 is under sufficient tension that it can be driven by motor 46. Threaded tension adjustment screw 110 permits further adjustment of the tension on conveyor belt 28 by raising or lowering the level of tension pad 96. When quick release assembly 50 is in the locked position, locking bolt 128 can be used to releasably secure quick release assembly 50 in the locked position.

Figure 6:
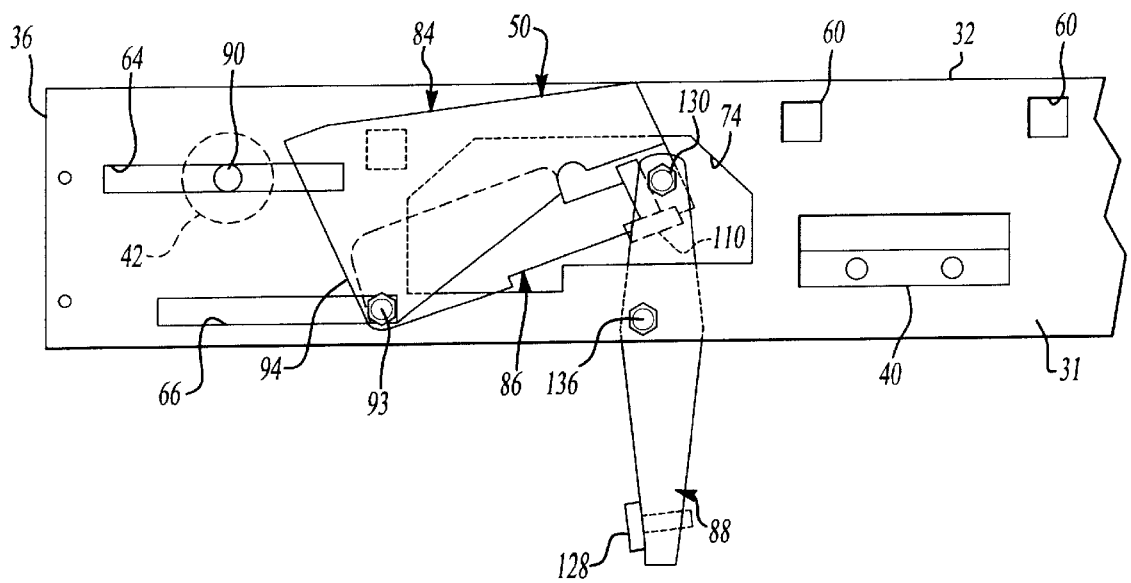
FIG. 6 is a side view of the quick release assembly at an unlocked position.

In FIG. 6 the quick release assembly 50 is shown in the unlocked position. Removal of locking bolt 128 and rotation of release handle 88 toward second end 36 slides take-up arm 84 and push bar 86 away from second end 36 of side rail 32. In FIG. 6 idler guide 42 is shown at a disengaged position. Rotation of release handle 88 toward second end 36 permits idler guide 42 to be removed from idler guide slot 64. Thus, when quick release assembly 50 is at an unlocked position a user can disassemble check-out conveyor assembly 26 rapidly.

Because check-out conveyor assembly 26 includes a quick release assembly 50 on each of side rails 32, quick release assembly 50 permits for rapid disassembly of check-out conveyor 26. In addition, having a quick release assembly 50 on each of side rails 32 ensures that conveyor belt 28 is aligned and centered on idler guide 42 when quick release assembly 50 is moved to the locked position.

The present invention has been described in accordance with the relevant legal standards, thus the foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

What is claimed is:

1. A check-out conveyor assembly for transporting merchandise comprising:
   a frame member having a pair of opposing side rails, each of said side rails including a take up arm slot and a quick release assembly, each of said quick release assemblies movable between a locked position and an unlocked position;
   an idler guide rotatably received in each of said opposing side rails and movable between an engaged position and a disengaged position;
   each of said quick release assemblies including a take up arm rotatably secured to a first end of a push bar by a fastener that extends through and is slidable within said take up arm slot and a release handle rotatably secured to a second end of said push bar, said take up arm selectively engaging said idler guide to permit movement of said idler guide between said engaged and said disengaged positions;
   said release handle being pivotable relative to said side rail;
   said take up arm and said push bar slidable along said take up slot when said quick release assembly is moved between said locked position and said unlocked position; and
   said quick release assemblies maintaining said idler guide at said engaged position when said quick release assemblies are at said locked position, said quick release assemblies permitting said idler guide to move to said disengaged position when at said unlocked position.

2. A check-out conveyor assembly for transporting merchandise as recited in claim 1 wherein said idler guide includes an idler guide axle extending from each end of said idler guide and each of said side rails includes an idler guide slot; and
   said idler guide axle received in each of said idler guide slots and said idler guide slidable within said idler guide slot between said engaged position and said disengaged position.

3. A check-out conveyor assembly for transporting merchandise as recited in claim 1 wherein each of said side rails further includes a release handle pivot hole and said release handle includes a pivot aperture;
   said pivot hole aligned with said pivot aperture and a pivot fastener extending through said pivot hole and said pivot aperture to pivotally secure said release handle to said side rail; and
   rotation of said release handle about said pivot fastener moving said quick release assembly between said locked position and said unlocked position.

4. A check-out conveyor assembly for transporting merchandise as recited in claim 1 wherein said frame member further includes a support member having a plurality of apertures and extending between said side rails and said release handle includes a tab having an aperture;
said aperture in said tab aligned with one of said apertures in said support member when said quick release assembly is at said locked position; and
   a fastener releasably securing said release handle to said support member when said quick release assembly is at said locked position.

5. A check-out conveyor assembly for transporting merchandise as recited in claim 1 wherein said take up arm further includes a tension pad and said push bar further includes a tension support, having a threaded aperture;
   said threaded aperture receiving a tension adjustment screw, said tension adjustment screw engaging said tension pad; and
   rotation of said tension adjustment screw within said threaded aperture altering engagement of said take up arm with said idler guide and thereby altering a tension on a conveyor belt.

6. A check-out conveyor assembly for transporting merchandise as recited in claim 1 wherein each of said side rails includes a plurality of support tabs, said plurality of support tabs supporting at least one conveyor belt pan extending between said side rails, said conveyor belt pan for supporting a conveyor belt.

7. A check-out conveyor assembly for transporting merchandise comprising:
   a frame member having a pair of opposing side rails, each of said side rails having a take up arm slot, a first end and a second end;
   a drive guide having a drive motor and received adjacent each first end of said opposing side rails;
   an idler guide rotatably received adjacent each second end of said opposing side rails and movable between an engaged position and a disengaged position;
   a conveyor belt, said belt encircling said drive guide and said idler guide;
   at least one quick release assembly adjacent said second end of one of said side rails, said quick release assembly including a take up arm rotatably secured to a first end of a push bar by a fastener that extends through and is slidable within said take up arm slot and a release handle rotatably secured to a second end of said push bar;
   said release handle rotatable relative to said side rail, rotation of said release handle relative to said side rail moving said quick release assembly between a locked position and an unlocked position;
   said take up arm and said push bar slidable along said take up slot when said quick release assembly is moved between said locked position and said unlocked position; and
   said quick release assembly maintaining said idler guide at said engaged position when at said locked position and permitting said idler guide to move to said disengaged position when at said unlocked position, said conveyor belt rotatable by said motor when said idler guide is at said engaged position.

8. A check-out conveyor assembly for transporting merchandise as recited in claim 7 wherein said idler guide includes an idler guide axle extending from each end of said idler guide and each of said side rails includes an idler guide slot; and
   said idler guide axle received in each of said idler guide slots and said idler guide slidable within said idler guide slot between said engaged position and said disengaged position.

9. A check-out conveyor assembly for transporting merchandise as recited in claim 7 wherein said frame member further includes a support member having a plurality of apertures and extending between said side rails and said release handle includes a tab having an aperture;

said aperture in said tab aligned with one of said plurality of apertures in said support member when said quick release assembly is at said locked position; and a fastener releasably securing said release handle to said support member when said quick release assembly is at said locked position.

10. A check-out conveyor assembly for transporting merchandise as recited in claim 7 wherein said take up arm further includes a tension pad and said push bar further includes a tension support having a threaded aperture;

said threaded aperture receiving a tension adjustment screw, said tension adjustment screw engaging said tension pad; and rotation of said tension adjustment screw within said threaded aperture altering engagement of said take up arm with said idler guide and thereby altering the tension on said conveyor belt.

11. A check-out conveyor assembly for transporting merchandise as recited in claim 7 wherein each of said side rails includes a plurality of support tabs, said plurality of support tabs supporting at least one conveyor belt pan extending between said side rails, said conveyor belt pan supporting said conveyor belt.

12. A check-out conveyor assembly for transporting merchandise comprising:

a frame member having a pair of opposing side rails, each of said side rails having a first end, a second end, and an inside face opposite an outside face;

a pair of quick release assemblies, one of said quick release assemblies located adjacent each of said second ends of each of said side rails, each of said quick release assemblies movable between a locked position and an unlocked position;

an idler guide rotatably received in each of said opposing side rails and movable between an engaged position and a disengaged position;

each of said quick release assemblies including a take up arm, a push bar, and a release handle;

said take up arm positioned adjacent said outside face and rotatably secured to a first end of said push bar, said push bar positioned adjacent said inside face, and said release handle positioned adjacent said in face and rotatably secured to a second end of said push bar such that said take up arm is located on one side of said side rail and said push bar and said release handle are located on an opposite side of said side rail;

said release handle pivotable relative to said side rail; and said quick release assemblies maintaining said idler guide at said engaged position when said quick release assemblies are at said locked position, said quick release assemblies permitting said idler guide to move to said disengaged position when at said unlocked position.

13. A check-out conveyor assembly for transporting merchandise as recited in claim 12 wherein said idler guide includes an idler guide axle extending from each end of said idler guide, said take up arm includes a first end, and each of said side rails includes an idler guide slot; and said idler guide axle received in each of said idler guide slots and slidable within said idler guide slot between said engaged position and said disengaged position, said first end of said take up arm engaging said idler guide axle when said quick release assembly is at said locked position.

14. A check-out conveyor assembly for transporting merchandise as recited in claim 12 wherein each of said side rails further includes a take up arm slot and said take up arm is rotatably secured to said first end of said push bar by a fastener that extends through and is slidable within said take up arm slot;

said take up arm and said push bar slidable along said take up slot when said quick release assembly is moved between said locked position and said unlocked position.

15. A check-out conveyor assembly for transporting merchandise as recited in claim 12 wherein each of said side rails further includes a release handle pivot hole and said release handle includes a pivot aperture;

said pivot hole aligned with said pivot aperture and a pivot fastener extending through said pivot hole and said pivot aperture to pivotally secure said release handle to said side rail; and rotation of said release handle about said pivot fastener moving said quick release assembly between said locked position and said unlocked position.

16. A check-out conveyor assembly for transporting merchandise as recited in claim 12 wherein said frame member further includes a support member having a plurality of apertures and extending between said side rails and said release handle includes a tab having an aperture;

said aperture in said tab aligned with one of said apertures in said support member when said quick release assembly is at said locked position; and a fastener releasably securing said release handle to said support member when said quick release assembly is at said locked position.

17. A check-out conveyor assembly for transporting merchandise as recited in claim 12 wherein said take up arm further includes a tension pad and said push bar further includes a tension support having a threaded aperture;

said threaded aperture receiving a tension adjustment screw, said tension adjustment screw engaging said tension pad; and rotation of said tension adjustment screw within said threaded aperture altering engagement of said take up arm with said idler guide and thereby altering a tension on a conveyor belt.

18. A check-out conveyor assembly for transporting merchandise as recited in claim 12 wherein each of said side rails includes a plurality of support tabs, said plurality of support tabs supporting at least one conveyor belt pan extending between said side rails, said conveyor belt pan for supporting a conveyor belt.

* * * * *